W. M. McLENDON.
Planter and Fertilizer.

No. 103,067. Patented May 17, 1870.

United States Patent Office.

WILLIS M. McLENDON, OF GREENVILLE, GEORGIA.

Letters Patent No. 103,067, dated May 17, 1870.

IMPROVEMENT IN COMBINED COTTON-SEED PLANTER AND FERTILIZER-DISTRIBUTER.

The Schedule referred to in these Letters Patent and making part of the same

*To all whom it may concern:*

Be it known that I, WILLIS M. McLENDON, of Greenville, in the county of Meriwether and in the State of Georgia, have invented certain new and useful Improvements in Combined Cotton-Seed Planter and Fertilizer-Distributer; and do hereby declare that the following is a full, clear, and exact description thereof, reference being had to the accompanying drawings and to the letters of reference marked thereon, making a part of this specification.

The nature of my invention consists in the construction and arrangement of a cotton-seed planter and fertilizer-distributer, as will be hereinafter fully set forth.

In order to enable others skilled in the art to which my invention appertains to make and use the same, I will now proceed to describe its construction and operation, referring to the annexed drawings, in which—

A represents the beam;

B, the shank;

C, the blade; and

D D, the handles of a plow, constructed in any of the known and usual ways.

To the plow-shank B and beam A are attached two adjustable arms E E, which extend downward in rear of the plow-shank, and have a wheel, G, pivoted between their lower ends.

The periphery of this wheel is beveled from the center inward toward the sides, and answers the double purpose of steadying the plow, and also to pack the dirt in the furrow made by the plow, preparing the furrow for the reception of the seed or fertilizer.

It will be observed that the wheel G follows immediately behind the plow, so that the dirt raised by the plow-blade has not time to fall back again into the furrow, but is immediately packed down by the beveled wheel.

From the connecting-rod, between the two handles D D, descend two arms, H H, in the lower ends of which a shaft, I, has its bearings.

Figure 1:
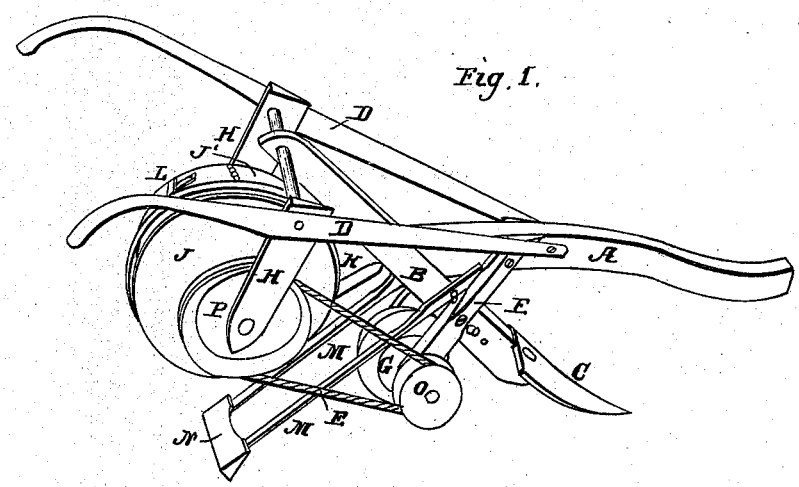
Figure 1 is a perspective view of my entire machine.
Figure 2:
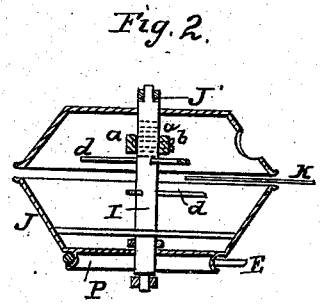
Figure 2 is a cross-section through the seed or fertilizer-receptacle.

On this shaft is placed the seed-receptacle, formed of two pan-shaped pieces, J J, facing each other, as shown in fig. 2, the shaft I passing through their center.

The pan J is firmly secured to the shaft, while the other pan J' is adjustable on the same, so as to regulate the distance between their inner edges, making the space or gutter between them larger or smaller, so as to sow more or less seed, at the option of the operator.

A cross-bar, $a$, is secured through or across the inside of the pan J', and said bar is, by a screw, $b$, fastened to the shaft I, so that the pan J', as well as the pan J, will revolve with the shaft.

By means of the screw $b$ the pan J' is also adjusted on the shaft I, for the purposes already mentioned.

On the shaft I are also a number of arms, $d\ d$, for the purpose of agitating the seed and preventing clogging.

From the rear side of the plow-stock B extends a spring-bar, K, into the space or gutter between the pans J J', for the purpose of cleaning the gutter, if it should become clogged up by the seed. It also answers the purpose of an agitator.

In the pan J is a door, L, for the purpose of admitting the seed, and also to gain access to the screw $b$.

Above the arms E E, on the plow-stock B, are pivoted two other arms, M M, one on each side, the outer or lower ends of said pivoted arms having the coverer N attached to them. This coverer follows immediately in rear of the wheel J J', covering up the seed.

The wheel J J' obtains its motion by means of a belt, $e$, connecting a pulley, O, on the same shaft on which the wheel G is placed, with a pulley, P, formed on the pan J, or on the shaft I.

The wheel J J', having the desired amount of seed placed in it, and the machine being in motion, the wheel revolves and distributes the seed in a regular, even stream in the middle of the furrow, and is then covered by the coverer N.

Fertilizer may be distributed with the same machine, which may be attached to any plow.

When it is used as a fertilizer-distributer, the arms M M, with the coverer N, are removed by merely taking out the bolt pivoting said arms to the plow-stock.

Having thus fully described my invention,

What I claim as new, and desire to secure by Letters Patent, is—

1. The adjustable arms E, with the beveled wheel G following immediately in rear of the plow, substantially as and for the purposes herein set forth.

2. The pan J', provided with cross-bar $a$ and screw $b$, substantially as and for the purposes herein set forth.

3. The combination of the beveled wheel G, seed or fertilizer-receptacle J J', spring bar K, and coverer N, all constructed and arranged to operate substantially in the manner and for the purposes herein set forth.

In testimony that I claim the foregoing, I have hereunto set my hand this 21st day of April, 1870.

WILLIS M. McLENDON.

Witnesses:
A. N. MARR,
C. L. EVERT.